US006820541B2

United States Patent
Siegel et al.

(10) Patent No.: US 6,820,541 B2
(45) Date of Patent: Nov. 23, 2004

(54) COOKIE BAKING SHEET WITH COOKIE SLIDE-OFF RAMP

(75) Inventors: Jeff Siegel, Kings Point, NY (US); Adam Krent, Brooklyn, NY (US); David Linn Burnett, New York, NY (US); William J. Lazaroff, Floral Park, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 0 days.

(21) Appl. No.: 10/389,565

(22) Filed: Mar. 17, 2003

(65) Prior Publication Data

US 2004/0182255 A1 Sep. 23, 2004

(51) Int. Cl.⁷ .................................................. A47J 37/10
(52) U.S. Cl. ....................... 99/422; 99/426; 220/573.2; 220/912
(58) Field of Search .................. 99/422, 426, DIG. 15; 220/573.2, 573.1, 912

(56) References Cited

U.S. PATENT DOCUMENTS

| | | | | |
|---|---|---|---|---|
| 1,396,684 A | * | 11/1921 | Hansen | 99/422 |
| 1,766,508 A | * | 6/1930 | Graf | 99/422 |
| 2,215,611 A | * | 9/1940 | Harper | 99/422 |
| D241,701 S | * | 10/1976 | Rader | D7/566 |
| 5,921,173 A | * | 7/1999 | Grycan et al. | 99/422 |

* cited by examiner

Primary Examiner—Reginald L. Alexander
(74) Attorney, Agent, or Firm—Goodman & Teitelbaum, Esqs.

(57) ABSTRACT

A cookie baking sheet is formed of substantially flat heat-resistant material including a baking surface in a first plane and defining a rolled peripheral edge and a baking area within the peripheral edge. A generally upright wall is integrally formed with the sheet material and extends along only a first portion of the periphery. This wall defines an upper edge contained within a second plane that is inclined relative to and meeting the first plane substantially along a second portion of the periphery. The upright wall is provided with a variable vertical height from a maximum predetermined height to a minimum predetermined height relative to said first plane. This variable height wall substantially encloses the baking area along the first portion of the peripheral edge. In the disclosed embodiment the baking sheet is rectangular and the upright wall extends along three of the sides while the fourth side is not founded by a wall. Baked cookies can only be slid off or pushed off into a receptacle without lifting the cookies along this second peripheral portion or fourth side, which serves as a slide-off chute or ramp.

5 Claims, 3 Drawing Sheets

COOKIE BAKING SHEET WITH COOKIE SLIDE-OFF RAMP

BACKGROUND OF THE INVENTION

1. Field of the Invention

This invention generally relates to the field of baking accessories, and more particularly to a cookie baking sheet with a cookie slide-off ramp.

2. Description of the Prior Art

The most popular type of non-stick pans have a uniform or continuous substantially vertical wall that extends about the entire peripheries of the pans. These are available as a deep loaf, a shallow jellyroll pan (when a shallow sheet has four sides it is called a jellyroll pan) and intermediate round pans. Non-stick is popular because it is low-cost and easy to use and clean. The coating is either silicone-based or PTFE-based, and is applied to carbon steel or aluminized steel. All of these shapes have a rolled edge. A rolled edge can only be applied to metal that lies in the same plane, therefore a plane could be placed along the top of all of the pieces above and it would touch the entire rolled edge. Non-stick bakeware needs less greasing than uncoated bakeware, a selling point to the consumer. The disadvantages of non-stick are that unless it is of the PTFE type, it will degrade in the dishwasher, and all types of non-stick will scar when they are exposed to sharp objects such as a cutting knife.

The rolled edge gives several advantages:

1. A non-stick coating is less likely to chip away because the sides are rounded.
2. The rolled edge is easier to hold and clean.
3. The rolled edge provides a point at which the pan can be hung during the time the non-stick is sprayed on manufacturing.

Other bakeware is known. Professional bakers prefer to cook on raw aluminum pans. The aluminum transfers heat well and is very durable. However, aluminum pans must always be greased well. It is not necessary to roll the edge because these pans are not coated and professionals are not concerned about the raw edge.

Fancy stainless steel bakeware has been sold mainly on the basis of its lustrous appearance. This bakeware will uphold a better finish than raw aluminum, but it does not transfer heat as well (which is important so that one can cook evenly) and it also needs to be well greased.

Tinned steel bakeware is usually the least expensive type of bakeware available, but it is also the least durable.

All of these types of bakeware without non-stick coatings need lengthy cleanups after use.

The standard four-sided, non-stick type of jellyroll pan on the market has four sides. Therefore, to remove the cookies one must lift them off the sheet rather than slide them over the edge. This can break or otherwise damage the cookies while they are still hot and soft.

Also known is a non-stick insulated cookie sheet. The advantage of an insulated sheet is that it heats more gently, and thus the cookies cook before they brown on the bottom. When insulated cookie sheets were first introduced, they tended to be made of aluminum or of tinned steel and so had longer cooking times. Now with dark-colored non-stick insulated sheets, the darker color makes the cooking time closer to normal.

Insulated sheets are typically not dishwasher safe due to the possibility that water may seep in and collect between the sheets. One example of an insulated cookie sheet includes two formed sheets of metal that have been crimped together. Because the edges have a continuous crimp around the perimeter, there can be a folded side only on one or two edges. This is because a fold in sheet metal manufacture can only occur in a straight line.

In some instances an insulated sheet is provided with two folded sides. In this case, there is still a possibility that cookies might slide off the wrong edge. Another insulated cookie sheet, with a fold on two sides, plus a third side with a raw edge has the advantage that here the cookies can be slid off one side only. The drawback, however, is that the third side has sharp edges and may be difficult to clean at the corners. This may be a reason why manufacturers do not use a non-stick coating on this item.

SUMMARY OF THE INVENTION

In order to overcome the disadvantages inherent in prior art cookie baking sheets, the present invention comprises a sheet of substantially flat, heat-resistant material forming a baking surface in a first plane and defining a rolled peripheral edge and a baking area within said peripheral edge. A generally upright wall is integrally formed with said sheet material and extends along only a first portion of said periphery and defines an upper edge contained within a second plane that is inclined relative to said first plane to provide said upright wall with a variable vertical height relative to said first plane from a maximum predetermined height to a minimum predetermined height relative to said first plane. In this manner, said variable height wall substantially encloses said baking area along said first portion of said peripheral edge, and baked cookies can only be slid off or pushed off into a receptacle without lifting the cookies along said second peripheral portion, which serves as a slide off chute or ramp.

This baking sheet allows the baking contents to be slid or pushed from the cooking surface, over the edge of the sheet. The edge, being a rolled edge or otherwise that is continuous around the entire sheet, utilizes an integrated, formed exit ramp. This sheet, of one-piece construction, can uniquely have three sides and a fourth side that serves as the exit ramp. Additionally, because the sheet has a rolled edge, it can be coated with a non-stick coating. The coating assists the sliding or pushing of the contents (if the same coating was applied to a sheet without a rolled edge, it may chip or crack at the edges).

BRIEF DESCRIPTION OF THE DRAWINGS

The above and other objects of the invention may be more readily seen when viewed in conjunction with the accompanying drawings, wherein.

DESCRIPTION OF THE PREFERRED EMBODIMENTS

Figure 1:
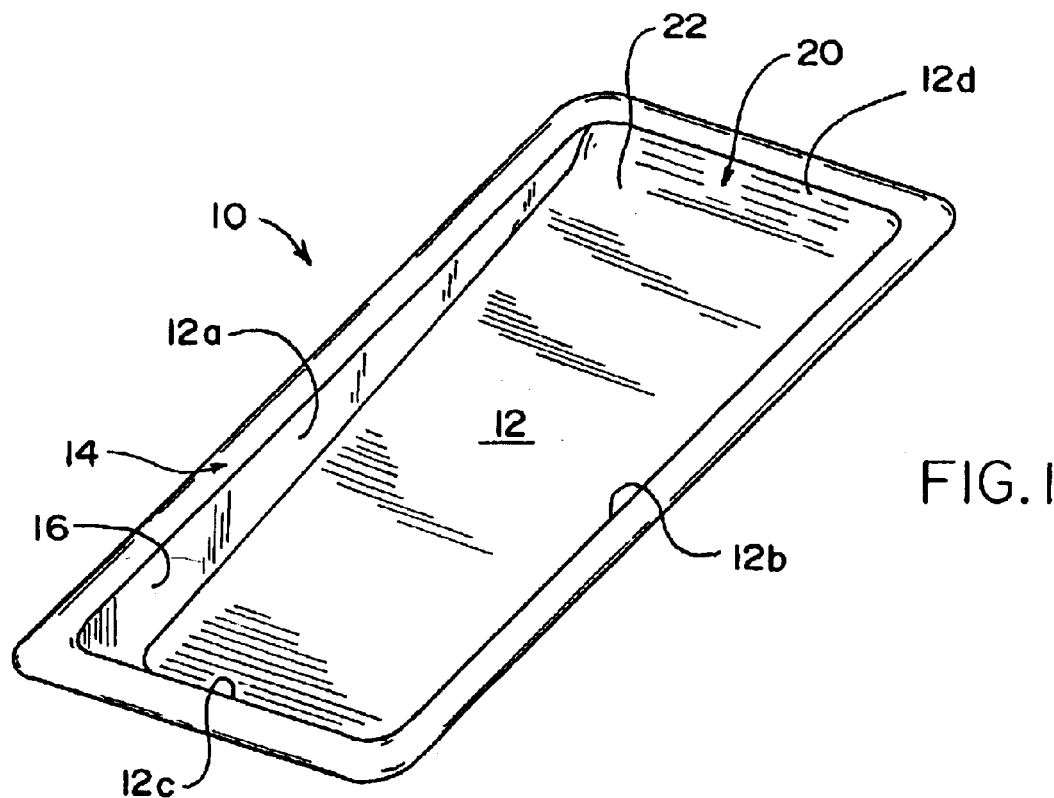
FIG. 1 is a perspective view of a cookie baking sheet with a cookie slide off ramp in accordance with the invention.
Figure 2:
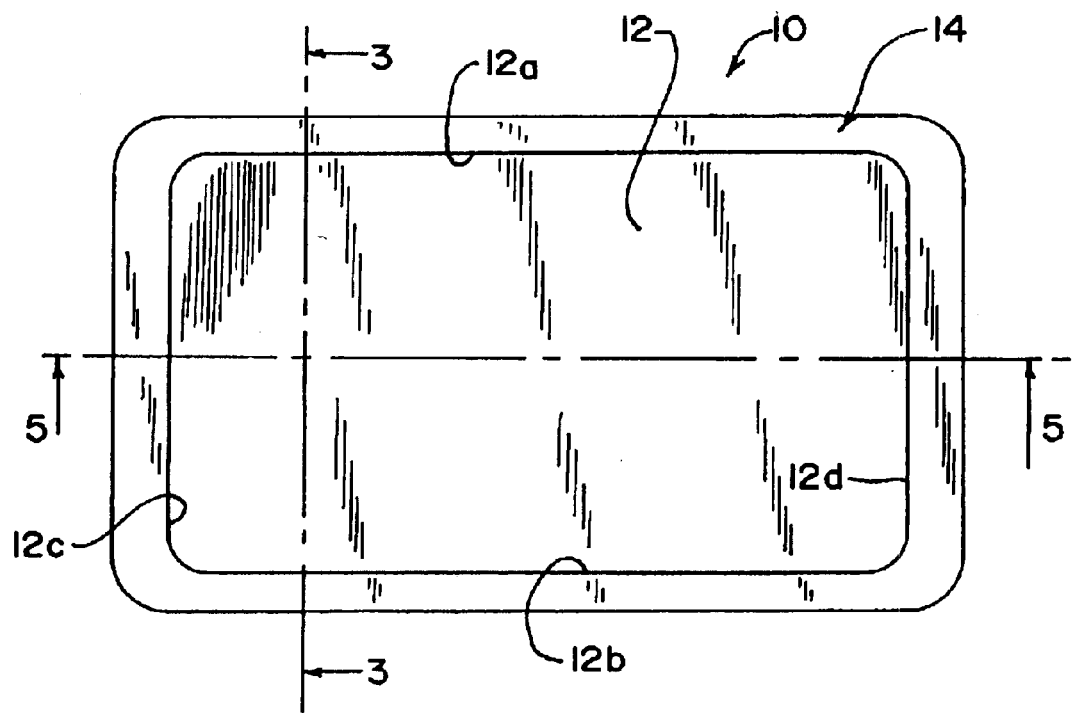
FIG. 2 is a top plan view of the baking sheet shown in FIG. 1.
Figure 3:
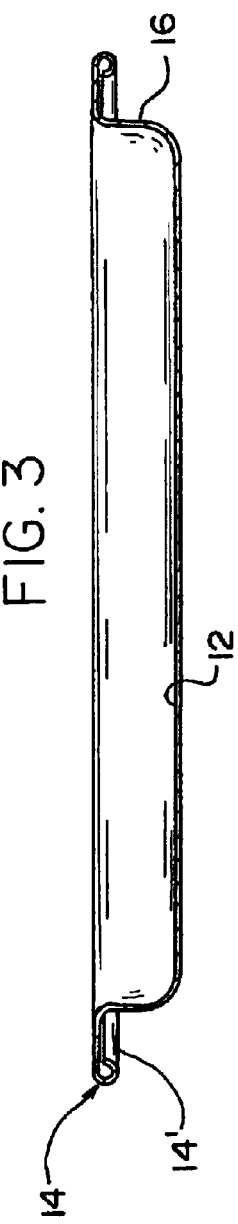
FIG. 3 is a cross sectional view of the baking sheet shown in FIG. 2, taken along the line 3—3.

Turning now to the Figures, in which identical or similar parts are designated by the same reference numerals throughout, and first referring to FIGS. 1 and 2, a cookie baking sheet in accordance with the present invention is generally designated by the reference number 10.

Figure 4:
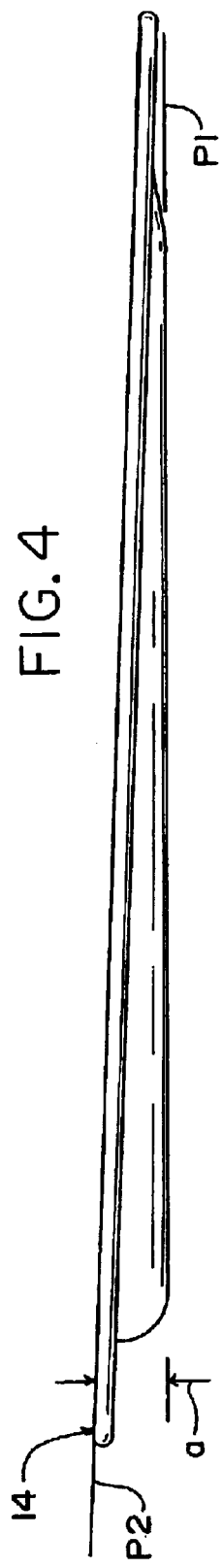
FIG. 4 is a side elevational view of the baking sheet shown in FIGS. 1 and 2.
Figure 5:
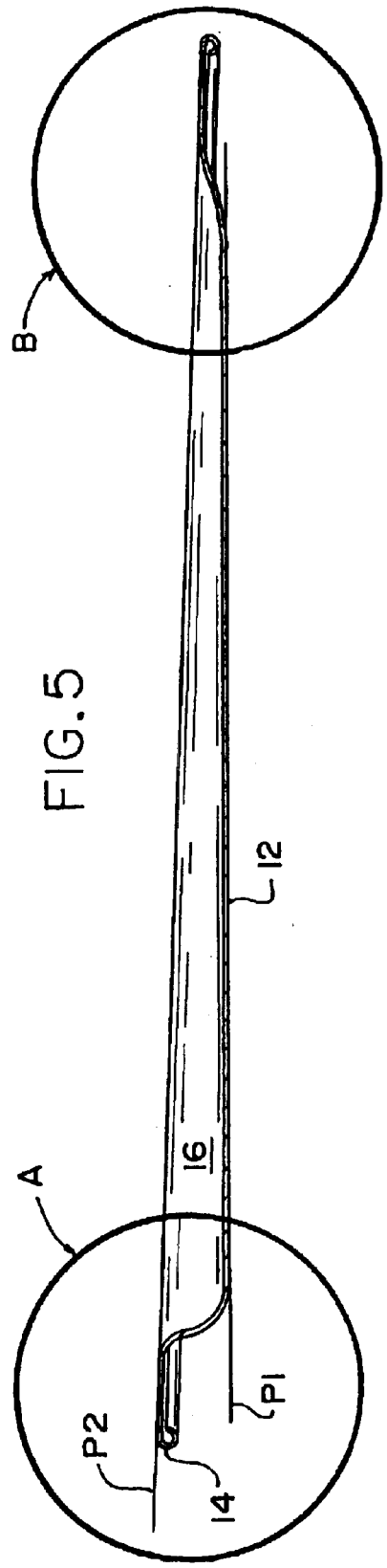
FIG. 5 is a cross sectional view of the baking sheet shown in FIG. 2, taken along line 5—5.
Figure 6:
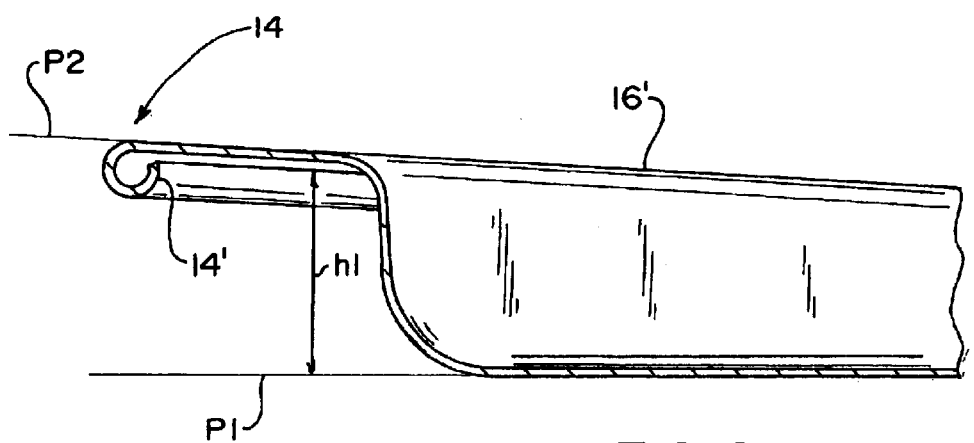
FIG. 6 is a partial enlarged cross sectional view of detail A in FIG. 5.

The baking sheet 10 is formed of a substantially flat heat-resistant material including a baking surface 12 arranged in a first plane P1 (FIGS. 4–6). A generally upright wall 16 is integrally formed with the flat sheet material forming the baking surface 12, and extends along only a first portion of the periphery and defines an upper edge 16' (FIG. 6), contained within a second plane P2 (FIGS. 5–7) that is inclined relative to and the first plane P1. The inclination of the planes is represented by the angle α in FIG. 4. The specific angle of inclination between the planes P1, P2 is not critical and may be relatively small for generally flat items like cookies. In the example illustrated, the angle α is equal to 2.3°. It will be clear from the Figs. that the planes P1, P2 will meet or intersect each other at a point beyond the baking sheet, primarily because of the rolled edge 14'. However, in accordance with the invention, the baking surface 12 is deflected upwardly, slightly away from the plane P1, in order to accommodate the rolled edge 14', forming a ramp or chute 22 that gradually lifts the cookies, baked on the baking surface 12, and allows the cookies to slide up the ramp or chute 22 and off of the edge at 20. The distance d in which the baking surface is deflected upwardly is not critical. However, clearly, the greater the distance d, the more gradual the inclination of the chute or ramp 22, the easier it is to slide the cookies up and off the ramp or chute without damaging them.

Referring in particular to FIG. 1, it will be noted that the upright wall 16 has a variable vertical height relative to the baking surface 12 and first plane P1, from a maximum predetermined height $H_1$ (FIG. 6) to a minimum height $H_2$ relative to the first plane P1. This provides a variable height wall that substantially encloses the baking area or surface 12, and baked cookies can only be slid off or pushed off into a receptacle without lifting the cookies along off the ramp or chute 22.

In the illustrated embodiment, the baking sheet 10 is substantially rectangular and is formed of two opposing longer sides 12a, 12b, and two opposing shorter sides 12c, 12d. A first portion of the periphery includes sides 12a–12c, along which edges there is provided the vertical upright wall 16 of varying height. The second peripheral portion, which is represented by the side 12d, does not have an upright vertical wall but, instead, has a very slight grade ramp or chute 22 that can only be used for sliding off the cookies.

An important feature of the invention is that the edge 14 is a rolled edge that extends continuously around the entire periphery of the sheet. By using an integrated, formed exit ramp 22, this sheet, of one piece construction, can exhibit three sides and a rolled edge.

Figure 7:
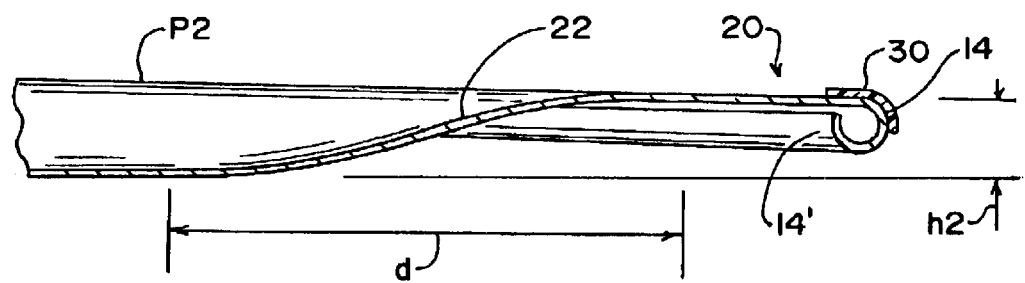
FIG. 7 is a partial enlarged cross sectional view of detail B in FIG. 5.

Because the sheet has a rolled edge, the sheet can be coated with a non-stick coating 30, a small section of which is represented in FIG. 7. The coating assists in the sliding or pushing of the contents, without chipping or cracking the edges of any baked pieces.

It will be evidently from the above that the cookie baking sheet in accordance with the present invention, having three sides and one exit ramp, where cookies can be slid off, facilitates the removal of baked cookies because of the provision of the rolled edge and easy, non-stick coating. The non-stick coating assists in sliding and baking. In this connection, any non-stick coating that is suitable for the purpose may be used. In the presently preferred embodiment, the coating is of the PTFE variety.

In conclusion, the present invention has the following advantages over the competition:

1. It has three sides and one exit ramp for sliding off the cookies;
2. It has a rolled edge for comfort and for easier non-stick application; and
3. Its non-stick coating assists in sliding and baking, and is of the PTFE type at the top of the line.

While this invention has been described in detail with particular reference to preferred embodiments thereof, it will be understood that variations and modifications will be effected within the spirit and scope of the invention as described herein and as defined in the appended claims.

We claim:

1. A cookie baking sheet comprising:
    a baking sheet (10) fabricated from a substantially flat heat-resistant material to provide a baking surface (12) disposed in a horizontal first plane (P1) for baking cookies thereon;
    a generally upright wall (16) extends vertically upwards from said baking surface (12) to a peripheral edge (14) along an upper portion of said baking sheet (10) to provide a baking area within said baking sheet (10);
    said peripheral edge (14) being disposed in an inclined second plane (P2) that is inclined relative to said first plane (P1) to provide a specific angle of inclination therebetween so that said upright wall (16) has a variable vertical height between said first and second planes (P1, P2) from a maximum predetermined height (H1) to a minimum predetermined height (H2);
    said baking sheet (10) having a substantially rectangular shape so that said upright wall (16) provides three sides (12a, 12b, 12c) of said baking sheet (10);
    a fourth side (12d) of said baking sheet (10) being disposed opposite one side (12c) of said three sides so that said fourth side (12d) is adjacent to said upright wall (16) having said minimum predetermined height (H2) to provide ramp means for baked cookies to be slid off or pushed off from said baking surface (12) into a receptacle without lifting the cookies, said ramp means being a slide-off chute or ramp (22);
    said baking surface (12) being provided with non-stick coating means (30) which co-acts with said specific angle of inclination to assist the user thereof when the baked cookies are being slid off or pushed off from the baking surface (12) without damaging the baked cookies; and
    said peripheral edge (14) being a rolled free edge (14') so that said non-stick coating means (30) can be easily applied to said baking surface (12).

2. A cookie sheet according to claim 1, wherein said fourth side (12d) of said baking sheet (10) and said one side (12c) being shorter sides of said rectangular shape of said baking sheet (10).

3. A cookie sheet according to claim 1, wherein said fourth side (12d) of said baking sheet (10) is substantially co-extensive with said baking surface (12) in said first plane (P1) to define said slide-off chute or ramp (22).

4. A cookie sheet according to claim 1, wherein said rolled free edge (14') is provided around the entire outer periphery of said peripheral edge (14) to extend outwardly from each of said four sides (12a, 12b, 12c, 12d) of said baking sheet (10).

5. A cookie sheet according to claim 1, wherein said non-stick coating means (30) is PTFE.

* * * * *